April 19, 1932.  W. H. McKISSICK  1,854,477
TUBING BLEEDER
Filed Sept. 19, 1929    2 Sheets-Sheet 1

Inventor
Wm H. McKissick
By Jack Aechley
Attorney

April 19, 1932.  W. H. McKISSICK  1,854,477
TUBING BLEEDER
Filed Sept. 19, 1929   2 Sheets-Sheet 2
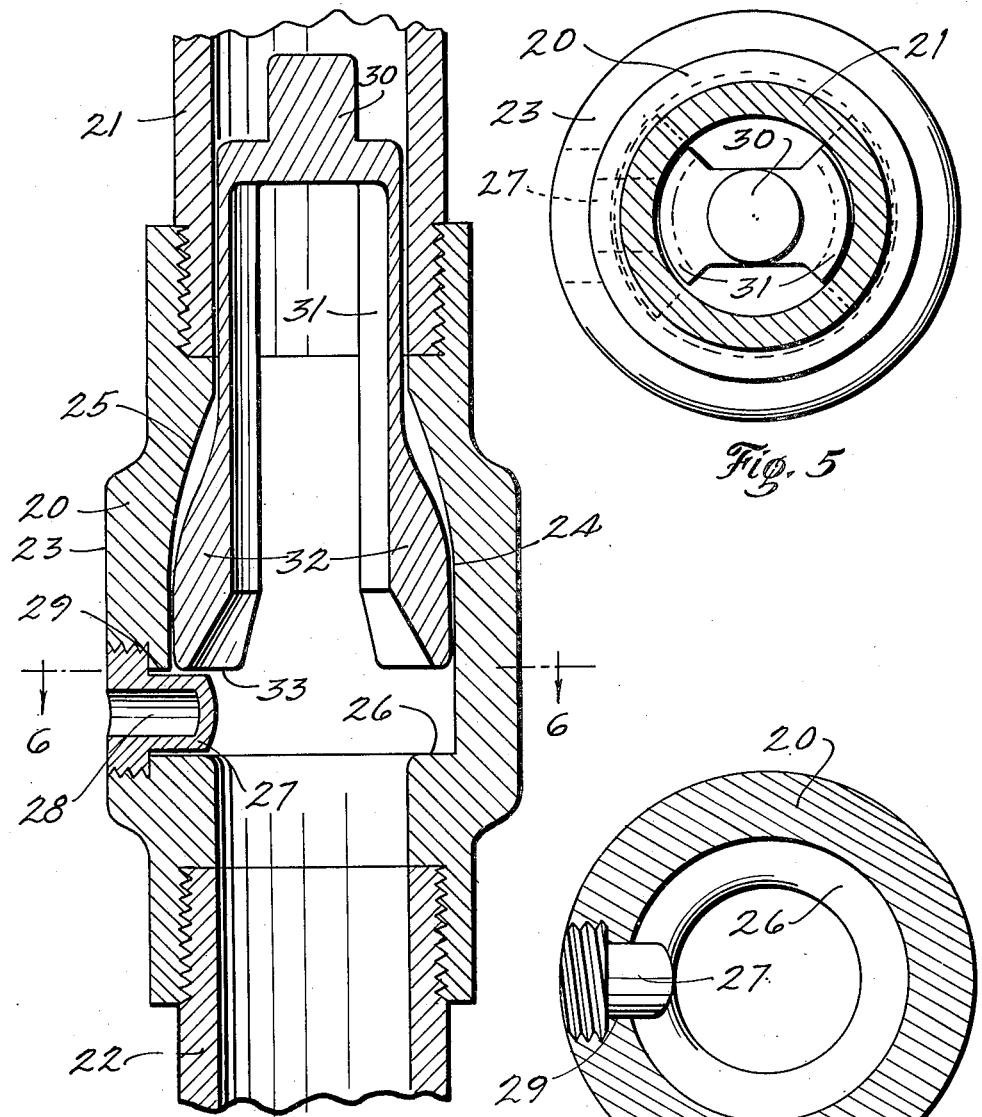
Inventor
Wm. H. McKissick
By Jack Atchley
Attorney Patented Apr. 19, 1932

1,854,477

UNITED STATES PATENT OFFICE

WILLIAM H. McKISSICK, OF TULSA, OKLAHOMA

TUBING BLEEDER

Application filed September 19, 1929. Serial No. 393,800.

This invention relates to new and useful improvements in tubing bleeders for wells.

One object of the invention is to provide frangible means in the tubing assembly so exposed in the bore or fluid passage of the tubing assembly as to be in the path of a weight dropped in the tubing, whereby the frangible element will be fractured and the liquid standing in the tubing above the element will be drained out.

A further object of the invention is to provide a frangible plug arranged to be screwed into the wall of the tubing assembly so as to protrude into the bore thereof and having a sealed duct to be opened when the protruding portion of the plug is fractured by a weight dropped in the tubing.

Another object of the invention is to provide a nipple for connecting in the tubing assembly preferably below the working valve, but above the standing valve and provided with a frangible element exposed in the bore for bleeding the tubing assembly when broken.

A still further object of the invention is to provide a frangible plug having a sealed duct and provided with screw threads so that it may be screwed into the side wall of the nipple or tubing assembly and readily replaced when broken.

A construction designed to carry out the invention will be hereinafter described together with other features of the invention.

The invention will be more readily understood from a reading of the following specification and by reference to the accompanying drawings in which an example of the invention is shown, and wherein Fig. 1 is a vertical sectional view of a portion of a working barrel including bleeding means constructed in accordance with the invention.

Fig. 4 is a view similar to Fig. 1 showing another form of the invention.

Fig. 5 is a plan view of the same, and

Fig. 6 is a horizontal cross-sectional view taken on the line 6—6 of Fig. 4.

Figures 1, 2, 3:
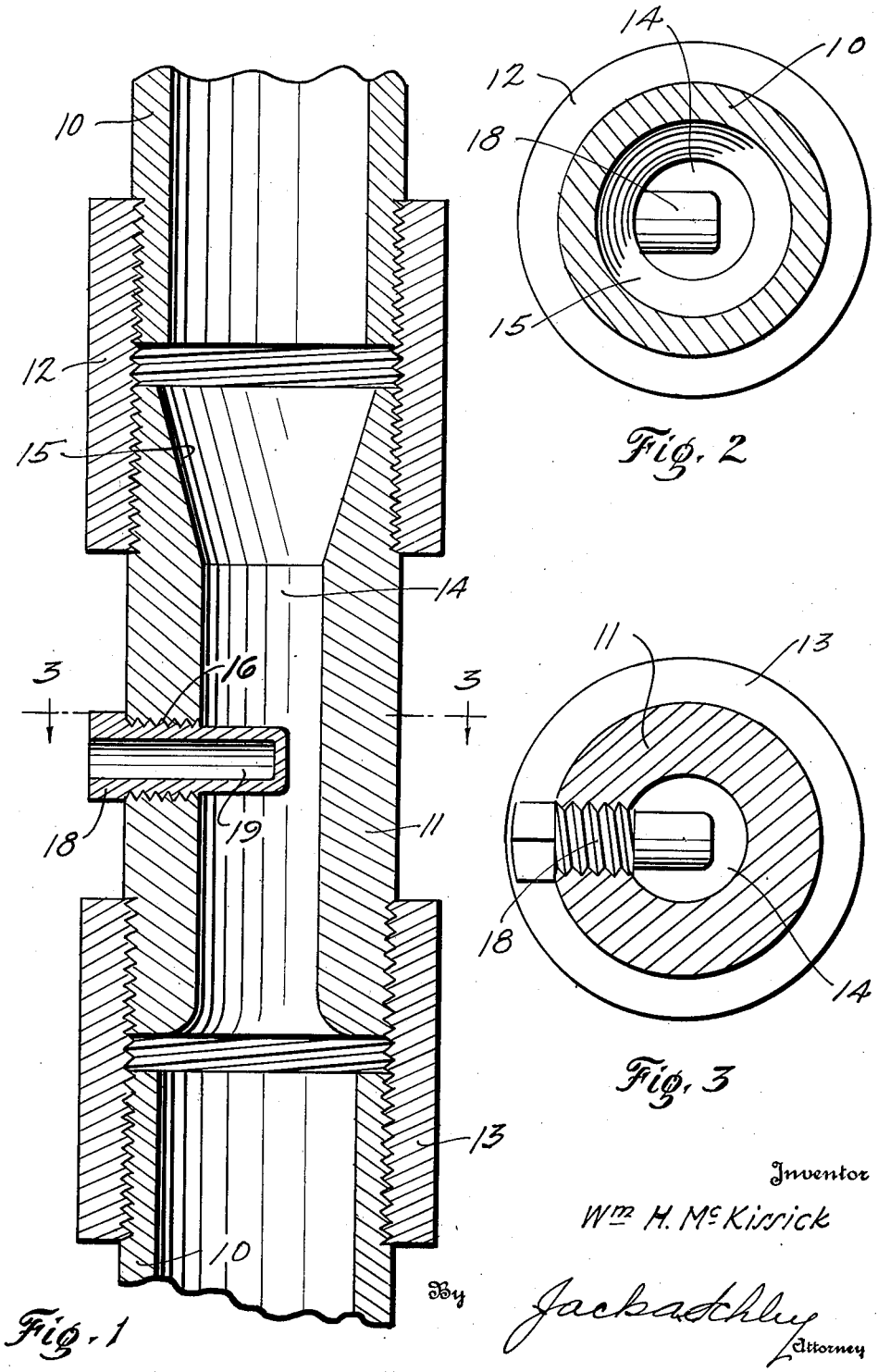
Fig. 2 is a plan view of the same.
Fig. 3 is a horizontal cross-sectional view taken on the line 3—3 of Fig. 1.

In the drawings the numeral 10 designates a section of working barrel having a nipple 11 coupled therein, by collars 12 and 13, intermediate the working valve and the standing valve, preferably nearer the standing valve.

The nipple has a reduced inside diameter or bore 14 with a flared throat 15 thereto at its upper end serving as a guide for a weight dropped therein.

A screw threaded opening 16 is provided in the side of the nipple and has screwed therein a headed frangible plug 18 having a sealed passage or duct 19. The sealed end of said plug extends into the reduced bore in the path of a weight dropped therein; whereby the plug will be fractured allowing for the drainage of liquid standing in the tubing above said plug.

The nipple being of reduced bore eliminates the possibility of the working valve entering said nipple and fracturing the plug when said valve is in operation.

Another form of the invention for use above the working barrel, as shown in Figures 4, 5, and 6, has a nipple so coupled intermediate a section of tubing 21 and a working barrel 22.

The nipple has a shoulder 23 providing for an enlarged bore 24 within said nipple. The enlarged bore is flared at its upper end 25 from the bore of the tubing and terminates at its lower end in a shelf 26, a frangible plug 27 having a sealed passage or duct 28 is screwed in an opening 29 of the nipple, said opening being located near the bottom of the enlarged bore.

The plug is headless but is provided with a suitable tool seat for screwing it into said opening thereby allowing said plug to be flush with the face of the shoulder. The sealed end of the plug extends into the enlarged bore within the limits of the shelf 26 thus out of the path of the working valve but within the path of a suitable weight 30 adapted to be dropped therein, thereby eliminating the possibility of the accidental fracture of said plug.

The suitable weight 30 to be dropped for fracturing the plug is yoke shaped having spring arms 31 terminating in shoes 32, enlarged to conform with the enlarged bore of said nipple and having a curved breaking edge 33. This weight is of sufficient weight to overcome the friction of the spring arms against the sides of the tubing and to provide sufficient force to fracture the plug when dropped thereon. The arms of the weight will expand into the enlarged bore of the nipple allowing the curved breaking edges of the shoes to make contact with the plug, whereby said plug will be fractured allowing for the drainage of liquid standing in the tubing above the plug.

Various changes in the size and shape of the different parts, as well as modifications and alterations, may be made within the scope of the appended claims.

What I claim is:

1. In a tubing bleeder, a tubing member having an opening in its side, and a frangible plug closing said opening and protruding into the member, said plug having a passage extending through the plug, the inner end of the passage being closed.

2. In a tubing bleeder, a tubing member having an opening in its side, and a frangible plug closing said opening, said plug having a discharge passage closed at its inner end and arranged to be opened upon fracture of the plug to drain the tubing.

3. In a tubing bleeder, a tubing nipple having a bore less in diameter than the tubing to which it is coupled, said nipple having a removable frangible plug screwed into one side and protruding into the bore of said nipple, said plug having a passage therein sealed at its inner end.

4. A pump for wells having a fluid passageway upwardly therethrough and a frangible plug threaded through the pump wall with its inner end projecting into said passageway, the outer end of the plug having a socket located so as to form a drain outlet when the inner end of the plug is broken off.

In testimony whereof I affix my signature.

WILLIAM H. McKISSICK.